W. F. EWALD.
RESILIENT WHEEL.
APPLICATION FILED OCT. 7, 1915.
1,215,511. Patented Feb. 13, 1917.
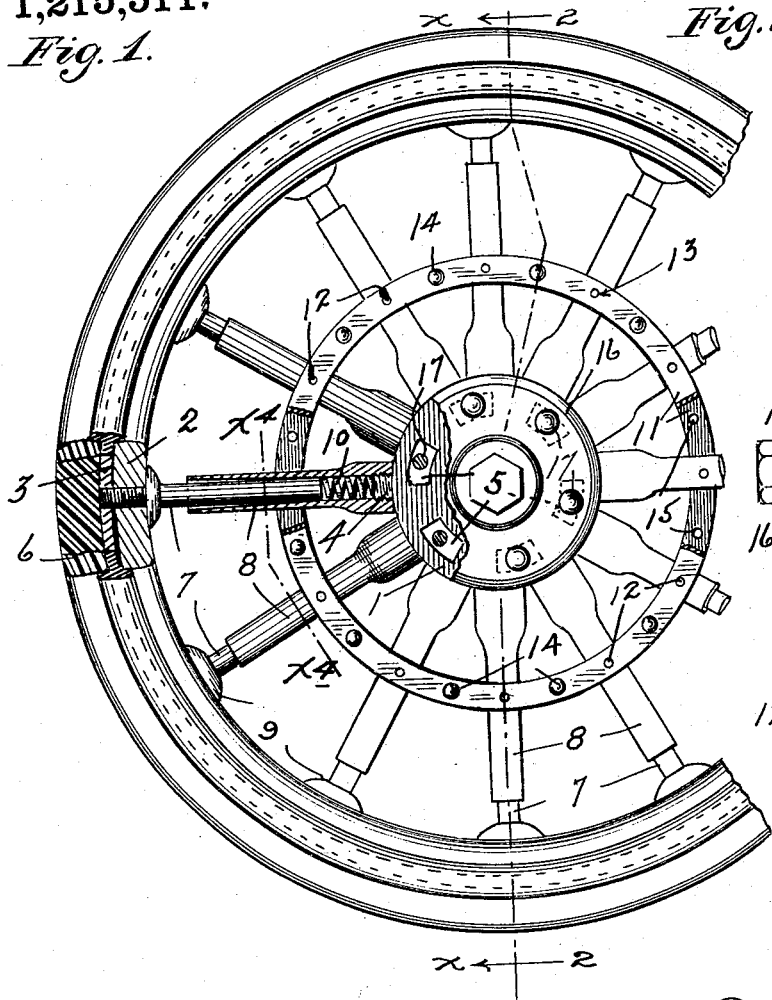
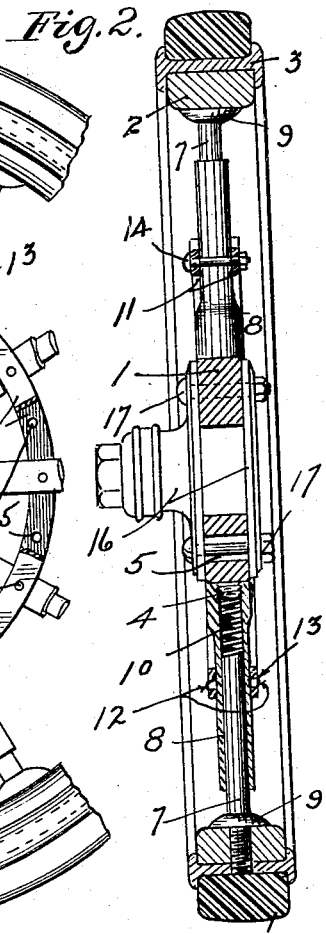
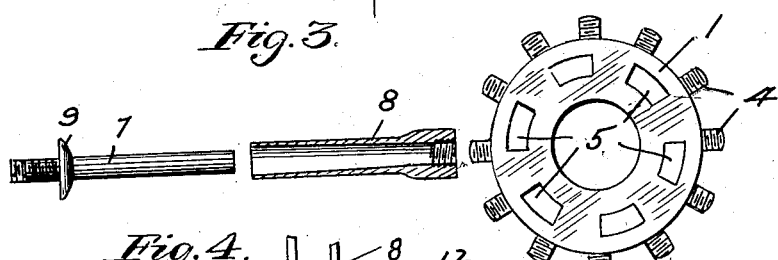
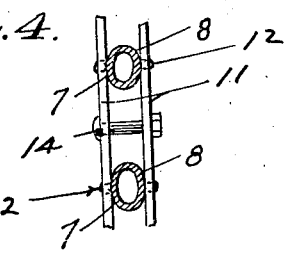
Witnesses
H. D. Kilgore
E. C. Skinkle
Inventor
William F. Ewald
By his Attorneys
Williamson Merchant

UNITED STATES PATENT OFFICE.

WILLIAM F. EWALD, OF JAVA, SOUTH DAKOTA.

RESILIENT WHEEL.

1,215,511.

Specification of Letters Patent. Patented Feb. 13, 1917.

Application filed October 7, 1915. Serial No. 54,531.

*To all whom it may concern:*

Be it known that I, WILLIAM F. EWALD, a citizen of the United States, residing at Java, in the county of Walworth and State of South Dakota, have invented certain new and useful Improvements in Resilient Wheels; and I do hereby declare the following to be a full, clear, and exact description of the invention, such as will enable others skilled in the art to which it appertains to make and use the same.

My invention relates to improvements in resilient wheels; and, to this end, it consists of the novel devices and combinations of devices hereinafter described and defined in the claim.

In the accompanying drawings, which illustrate the invention, like characters indicate like parts throughout the several views.

Referring to the drawings,

Figure 1 is a side elevation of the improved wheel, some parts being broken away and some parts being shown in section;

Fig. 2 is a vertical section taken on the irregular line $x^2$ $x^2$ of Fig. 1;

Fig. 3 is a view, partly in side elevation and partly in section showing the supplemental hub and the members of one of the spokes separated; and Fig. 4 is a detail view, partly in elevation and partly in section taken on the irregular line $x^4$ $x^4$ of Fig. 1.

The numeral 1 indicates a supplemental hub and the numerals 2 and 3 indicate, respectively, inner and outer rims. The supplemental hub 1 is provided with a plurality of radial studs 4 circumferentially spaced, and it is also provided with a plurality of transverse openings 5, that are rectangular in cross section and circumferentially spaced.

As shown, the outer rim 3 is made of metal and in cross section is in the form of an I-beam. The inner rim 2 is also preferably made of metal and is seated on the outer rim between its inwardly projecting flanges. A tire 6, of rubber or of other suitable material, is seated on the outer rim 3 between its outwardly projecting flanges.

The two rims 2 and 3 are connected to the supplemental hub 1 by a plurality of metal spokes, each comprising inner and outer telescopically connected members 7 and 8, respectively. Integrally formed with the spoke members 7, inward of their outer ends, are annular shoulders or collars 9, which bear against the inner rims 2. These spoke members 7, outward of their shoulders 9, are extended through coincident perforations, formed in the two rims 2 and 3, and have screw-threaded engagement therewith. By thus connecting the spoke members 7 to the rims 2 and 3, said rims are securely locked against circumferential movement, one upon the other.

Internally, the spoke members 8 are flared outwardly circumferentially with respect to the wheel, to allow a limited movement of the spoke members 7 therein, but closely engage and hold said spoke members 7 against movement therein transversely of the wheel. This play of the spoke members 7 in the spoke members 8, circumferentially of the wheel, together with loose joints and yielding parts of the wheel, permits the required eccentric movement of the wheel hub in respect to the rim thereof, to make the wheel resilient under the action of the springs 10.

The tubular or inner spoke members 8 are fitted over the studs 4 and have screw-threaded engagement therewith. Coiled springs 10, located in the spoke members 8, are compressed between the studs 4 and the inner ends of the spoke members 7 and tend to keep the two rims 2 and 3 and supplemental hub 1 concentrically located with respect to each other.

All of the spoke members 8 are rigidly connected and held properly spaced, with respect to each other, by a truss in the form of a pair of laterally spaced flat annular rings 11, which embrace said inner members 8, substantially at their longitudinal centers. These rings 11 are detachably connected to each spoke member 8 by studs 12, integrally formed with said spoke members 8 and seated in perforations 13 formed in said rings. The ring members 11 of the truss are drawn toward each other and clamped onto the outer faces of the spoke members 8 by clamps 14, in the form of nut-equipped draw bolts passed through alined perforations 15, formed in the rings 11, substantially half way between each pair of spokes. Obviously, this truss greatly strengthens the wheel.

A two-part hub 16 of standard construction is secured to the supplemental hub 1 by nut-equipped bolts 17, passed through alined perforations in the members of the said two-part hub, which embrace the supplemental hub 1, and through the transverse openings 5 in said supplemental hub.

What I claim is:—

A resilient wheel including a hub member having a plurality of radial studs circumferentially spaced and externally screw-threaded, a rim, and two-part spokes connecting the hub member and rim, the inner members of the spokes being tubular and having screw-threaded engagement with the studs of the hub member and the outer members thereof having screw-threaded engagement with the rim, said outer member also having shoulders engaging the rim.

In testimony whereof I affix my signature in presence of two witnesses.

WILLIAM F. EWALD.

Witnesses:
EMILY T. HICKS,
P. H. SPIVY.